(No Model.)

M. L. CARPENTER.
FLY TRAP.

No. 574,785. Patented Jan. 5, 1897.

Witnesses.
G. M. Anderson
P. C. Masi.

Inventor.
M. L. Carpenter
by E. W. Anderson
his Attorney.

UNITED STATES PATENT OFFICE.

MYRON L. CARPENTER, OF HORSEHEADS, NEW YORK.

FLY-TRAP.

SPECIFICATION forming part of Letters Patent No. 574,785, dated January 5, 1897.

Application filed April 2, 1896. Serial No. 585,944. (No model.)

*To all whom it may concern:*

Be it known that I, MYRON L. CARPENTER, a citizen of the United States, and a resident of Horseheads, in the county of Chemung and State of New York, have invented certain new and useful Improvements in Fly-Traps; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
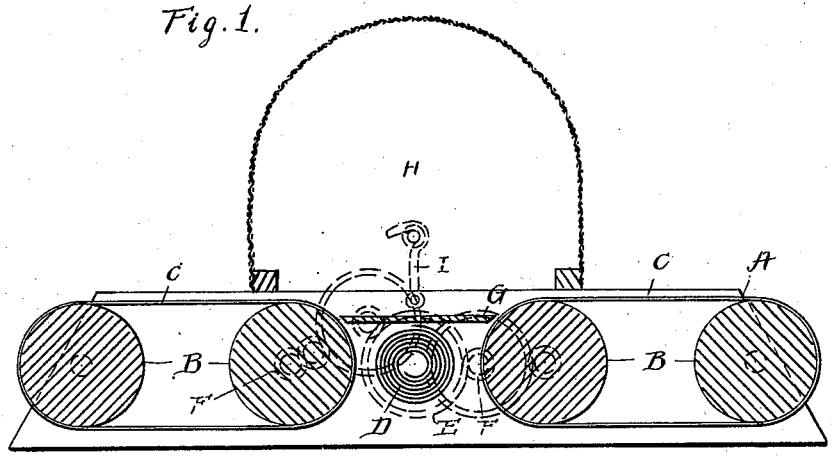
Figure 2:
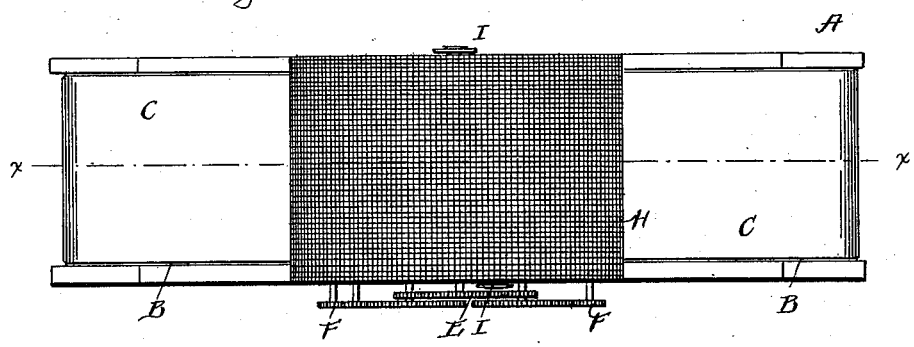

Figure 1 of the drawings is a section on line $xx$, Fig. 2. Fig. 2 is a plan view of trap.

The object of this invention is to provide a fly-trap of improved character; and the invention consists in the novel construction and combination of parts, all as hereinafter described, and pointed out in the appended claim.

Referring to the accompanying drawings, the letter A designates an oblong box open at its ends and at the top, at the end portions. Journaled transversely of the said box are two pairs of cylinder-drums B, there being one drum at each end of the box and two drums near the center and separated from each other a short distance. Running around each pair of drums is an endless apron C, the surface of which is designed to be coated with some syrupy sticky material, such as molasses. At the center of the box between the two central drums is a spring D, which is arranged to actuate suitable gear E, which is arranged to actuate gears F on the shafts of said central drums. On the top of the case or closure which contains the spring is placed a transverse clearing-board G, whose longitudinal edges are in close relation to the respective aprons where the latter pass over the central drums. Above and over said drums and the clearing-board is a cage H, whose upper portion is preferably formed of wire-cloth of sufficiently fine mesh to prevent the escape of flies therethrough. This cage is removable and is secured to the case A by means of hooks I or other suitable fastenings.

The end drums B are arranged, as indicated in the drawings, so that portions of their surfaces project beyond the oblique ends of the case A.

The spring being wound up, the aprons are moved slowly in such a direction that their upper portions move toward the center of the box A. The flies are attracted onto the aprons by the coating thereon and are carried toward the center of the box until knocked off by the clearing-board into the cage H. When a sufficient number of flies have been caught, they may be killed by pouring hot water into the cage or by placing the trap in a hot oven or in any other suitable manner. The cage can then be removed and the dead flies cleared out.

Having thus described my invention, what I claim as new, and desire to secure by Letters Patent, is—

The herein-described fly-trap, comprising an oblong box having closed sides and open top and end portions a cylinder-drum journaled transversely at each end portion of the said box, two similar drums journaled at the central portion of said box, with a space between them, a spring-motor located in such intermediate space, and geared to the two central drums to revolve them in opposite directions, the two endless aprons carried by the drums, the clearing-board between the two central drums above the motor and having one of its edges adjacent to each, and the open-bottom, perforated, cage removably supported on the box above the clearing-board and central drums.

In testimony whereof I affix my signature in presence of two witnesses.

MYRON L. CARPENTER.

Witnesses:
JAMES D. SHOOTS,
C. E. CARPENTER.